US008659178B2

(12) United States Patent
Arlabán Gabeiras et al.

(10) Patent No.: US 8,659,178 B2
(45) Date of Patent: Feb. 25, 2014

(54) WIND TURBINE CONTROL METHOD, CONTROL UNIT AND WIND TURBINE

(75) Inventors: Teresa Arlabán Gabeiras, Sarriguren (ES); Oscar Alonso Sádaba, Sarriguren (ES); Alberto Garcia Barace, Sarriguren (ES); Ricardo Royo García, Sarriguren (ES); Stephen Tonks, Sarriguren (ES); José Miguel García Sayés, Sarriguren (ES); Miguel Nuñez Polo, Sarriguren (ES)

(73) Assignee: Acciona Windpower, S.A., Sarriguren, Navarra (ES)

( * ) Notice: Subject to any disclaimer, the term of this patent is extended or adjusted under 35 U.S.C. 154(b) by 286 days.

(21) Appl. No.: 12/703,837

(22) Filed: Feb. 11, 2010

(65) Prior Publication Data

US 2010/0219634 A1    Sep. 2, 2010

(30) Foreign Application Priority Data

Feb. 27, 2009    (ES) .................................. 200900551

(51) Int. Cl.
*F03D 9/00*    (2006.01)

(52) U.S. Cl.
USPC .......................................................... 290/44

(58) Field of Classification Search
USPC ....... 290/44, 55; 415/1; 416/1; 700/286, 287, 700/288, 290
See application file for complete search history.

(56) References Cited

U.S. PATENT DOCUMENTS

| 4,453,378 | A  | * | 6/1984  | Zagranski et al. | ............... 60/779 |
| 4,695,736 | A  | * | 9/1987  | Doman et al. | .................. 290/44 |
| 6,417,578 | B1 | * | 7/2002  | Chapman et al. | ............... 290/44 |
| 7,038,330 | B2 | * | 5/2006  | Rosebrock et al. | ............. 290/44 |
| 7,531,911 | B2 | * | 5/2009  | Rivas et al. | ...................... 290/44 |
| 7,560,824 | B2 | * | 7/2009  | Hehenberger | .................. 290/44 |
| 7,582,977 | B1 | * | 9/2009  | Dehlsen | ........................ 290/1 R |
| 7,755,210 | B2 | * | 7/2010  | Kammer et al. | ................. 290/44 |
| 7,800,242 | B2 | * | 9/2010  | Stiesdal | .......................... 290/44 |
| 7,859,125 | B2 | * | 12/2010 | Nielsen et al. | .................. 290/44 |

(Continued)

FOREIGN PATENT DOCUMENTS

EP    1007844    7/2004

OTHER PUBLICATIONS

Wikipedia Encyclopedia, "Direct Torque Control", http://en.wikipedia.org/wiki/Direct_torque_control, last modified Dec. 12, 2009 at 21:02.

*Primary Examiner* — Tulsidas C Patel
*Assistant Examiner* — Viet Nguyen
(74) *Attorney, Agent, or Firm* — Merchant & Gould P.C.

(57) ABSTRACT

A wind turbine control method for dampening vibrations of a transmission system, even in the presence of voltage dips and in any event that is susceptible to reducing active current generation capacity, is provided. First, for example, an initial torque or power instruction may be calculated based on a turbine operating state. Next, a torque or power adjustment term associated with dampening vibration modes of a turbine transmission system may be calculated. Then, a final torque or power instruction may be calculated by, for example, applying the adjustment term to the initial instruction. Finally, the final torque or power instruction may be transformed into a current instruction for controlling the wind turbine.

19 Claims, 3 Drawing Sheets

(56) References Cited

U.S. PATENT DOCUMENTS

| | | | |
|---|---|---|---|
| 7,898,099 B2 * | 3/2011 | Stiesdal | 290/44 |
| 8,026,623 B2 * | 9/2011 | Wakasa et al. | 290/44 |
| 8,174,137 B2 * | 5/2012 | Skaare | 290/44 |
| 2005/0012339 A1 * | 1/2005 | Mikhail et al. | 290/44 |
| 2006/0066111 A1 * | 3/2006 | Suryanarayanan et al. | 290/44 |
| 2007/0057517 A1 * | 3/2007 | McNerney | 290/44 |
| 2007/0176428 A1 * | 8/2007 | Nagao | 290/44 |
| 2008/0048501 A1 * | 2/2008 | Jurkat et al. | 307/81 |
| 2008/0143111 A1 * | 6/2008 | Ichinose et al. | 290/44 |
| 2008/0157530 A1 * | 7/2008 | Corcelles Pereira et al. | 290/44 |
| 2008/0206051 A1 * | 8/2008 | Wakasa et al. | 416/41 |
| 2008/0252076 A1 * | 10/2008 | Fortmann et al. | 290/44 |
| 2008/0260514 A1 * | 10/2008 | Nielsen et al. | 415/4.3 |
| 2009/0055030 A1 * | 2/2009 | Mayor et al. | 700/287 |
| 2009/0273187 A1 * | 11/2009 | Gertmar et al. | 290/44 |
| 2010/0111693 A1 * | 5/2010 | Wilson | 416/1 |
| 2010/0142237 A1 * | 6/2010 | Yuan et al. | 363/97 |
| 2010/0283247 A1 * | 11/2010 | Krueger | 290/44 |
| 2011/0040414 A1 * | 2/2011 | Nyborg | 700/280 |

\* cited by examiner

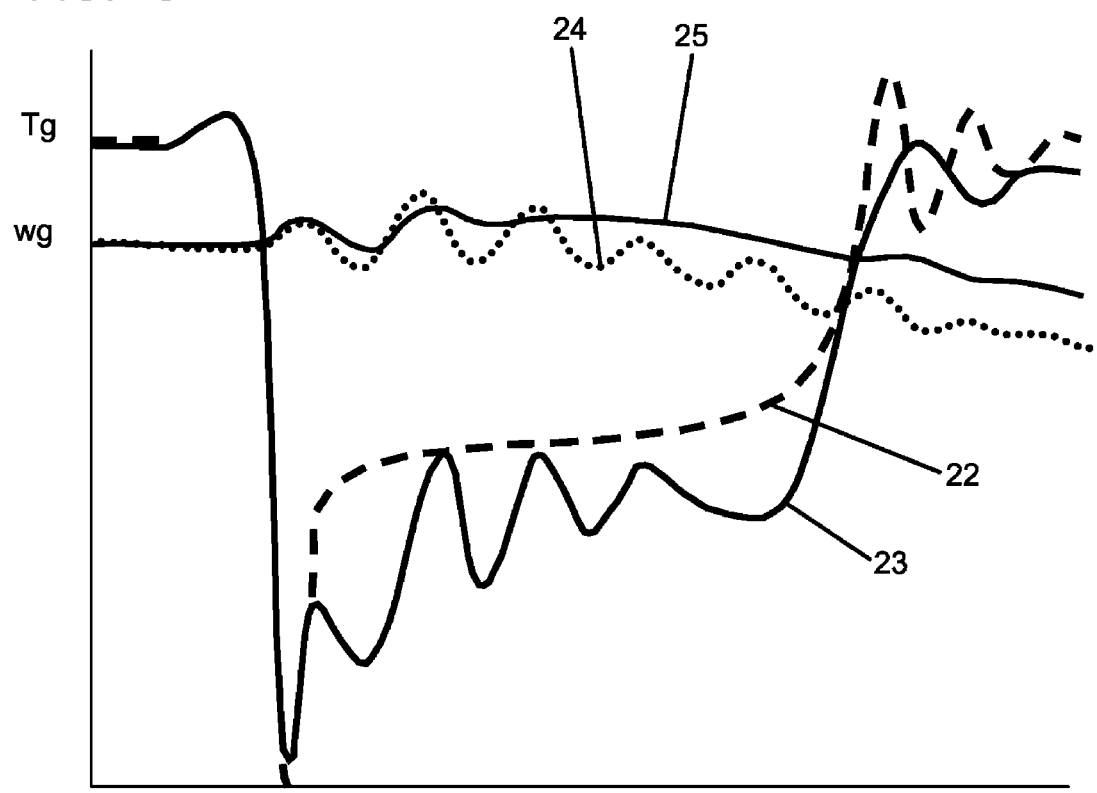

WIND TURBINE CONTROL METHOD, CONTROL UNIT AND WIND TURBINE

RELATED APPLICATION

This application claims priority benefits based on Spanish Patent Application No. P200900551, entitled "WIND TURBINE CONTROL METHOD, CONTROL UNIT AND WIND TURBINE," filed Feb. 27, 2009, the disclosure of which is hereby incorporated herein by reference.

BACKGROUND

Wind turbine is a rotating machine that converts the kinetic energy of wind into mechanical energy. If the mechanical energy is used directly by machinery, such as pumping water, cutting lumber or grinding stones, the machine is called a windmill. If the mechanical energy is instead converted to electricity, the machine is called a wind generator, wind turbine.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A wind turbine control method for dampening vibrations of a transmission system is provided. First, for example, an initial torque or power instruction may be calculated based on a turbine operating state. Next, a torque or power adjustment term associated with dampening vibration modes of a turbine transmission system may be calculated. Then, a final torque or power instruction may be calculated by, for example, applying the adjustment term to the initial instruction. Finally, the final torque or power instruction may be transformed into a current instruction for controlling the wind turbine.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 5 shows comparative results charts with a control system.

DETAILED DESCRIPTION

Figure 1:
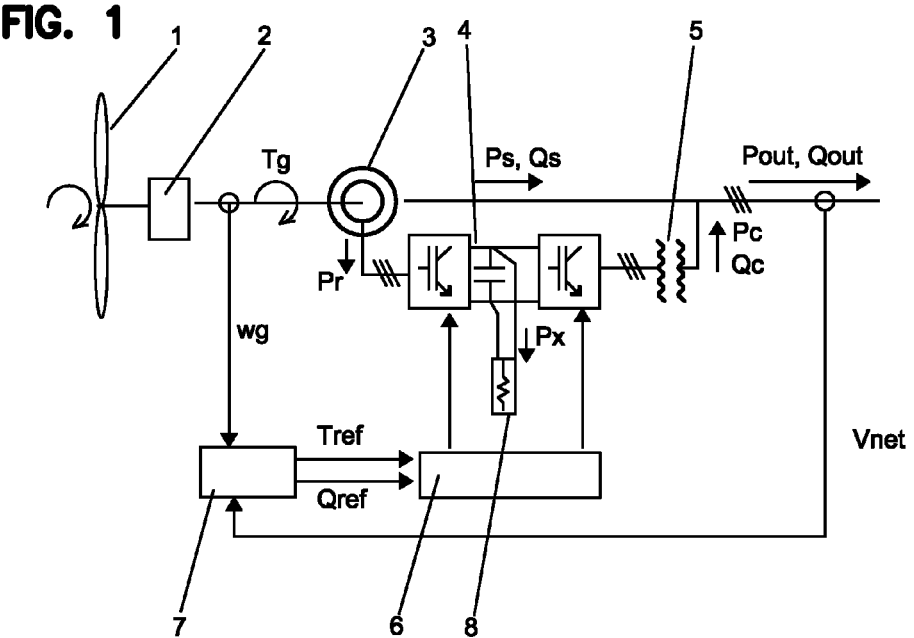
FIG. 1 is a view of a doubly fed wind turbine.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Wind turbines may comprise an electric generator and a converter connected to a generator, thereby controlling generator torque or power. Wind turbines may also comprise control systems wherein the torque or power instructions may be calculated based on turbine operating parameters such as generator rotation speed, power generated, or wind speed.

A transmission system, which may transmit the torque from an aerodynamic rotor to a rotor of the electric generator, may have certain vibration modes due to the moments of inertia and torsional rigidity of different components. The vibrations may cause fatigue in the mechanical components, particularly in the multiplier, if there is one.

Control systems may incorporate algorithms where the torque or power instructions for dampening the vibrations of the transmission system may be modified in order to reduce component fatigue. For example, U.S. Pat. No. 4,453,378 B1 discloses a technique for dampening vibrations in the transmission system that actuates helicopter rotor blades. The dampening may be achieved by subtracting a term calculated based on a rotation speed of a rotor from an engine control signal, thereby generating a torque in counter phase to the oscillations of the transmission system.

Likewise, EP Patent No. 1,007,844 B1 discloses a loop that may calculate a torque instruction based on an error between power generated and a power instruction. A vibration-dampening term calculated by applying a filter to the speed of the generator may be subtracted from the instruction.

The described control techniques may be applied to different conversion configurations, both in a doubly fed generator and a total power converter. The doubly fed generator may comprise an induction generator having its stator connected to a power grid and a rotor connected to a converter, wherefrom currents in the generator rotor may be controlled, thereby controlling both a torque and a generation of reactive power in the generator. A configuration with a total power converter may be one wherein the stator of a generator, which may be synchronous or asynchronous, is connected to a converter wherethrough all the power generated passes.

Torque and power in a generator may be related by the rotation speed of the rotor. In the same manner that controls have been described that generate the torque instructions with the object of dampening the oscillations in the transmission system, controls may be carried out that generate power instructions for the same purpose. Additionally, in a doubly fed generator, the power generated by the stator may be a parameter that only differs from the electric torque in one constant. Accordingly, controls based on stator power rather than torque may be carried out.

On the other hand, the maximum generator and converter currents may be respected. For this reason, the converter control units may incorporate current limiters. During a voltage dip, the maximum evacuable power may decrease in parallel with tension.

Conventionally, torque or power instructions may contain a transmission system-dampening term that may imply a modulation of the same frequency as the oscillations of the transmission system. However, during a voltage dip, this instruction may not be followed due to the obliged limitation in the currents, which may cause the effective torque in the generator to be the same as that corresponding to the maximum currents, and, therefore, the dampening term may disappear in the effective torque. Consequently, during the voltage dip, effective generator torque may not have the torque modulation of the torque instruction, which may be achieved by the dampening term.

In accordance with embodiments of the invention, a wind turbine of variable speed may comprise a rotor, a power train coupled to the rotor that may transmit mechanical power to an electric generator, and a converter connected to said generator having a control unit that may calculate the torque or power instructions. The converter may control the generator torque or power by, for example, calculating an initial torque or power instruction based on turbine operating state, calculating a torque or power adjustment term, applying an adjustment term to the initial instruction, and subsequently calculating a final torque or power instruction to dampen the vibration modes of the transmission system.

Dampening vibrations of a transmission system may comprise, for example, estimating a maximum evacuable active power based on power grid voltage, estimating a maximum probable value for the adjustment term, calculating a limit value of the initial torque or power instruction based on the maximum evacuable power and said maximum probable value for the adjustment term, and applying said limit value to the initial torque or power instruction prior to applying the adjustment term for calculating the final instruction, thereby reserving a margin so that the adjustment term dampens the vibrations of the transmission system.

Therefore, as the initial instruction is limited before applying the adjustment term, the final instruction may generally be lower or equal to a corresponding maximum evacuable power to the grid. The consequence of this is that, even during a voltage dip, an effective electric torque in the machine may have a torque modulation implied by the adjustment term, maintaining active dampening in the transmission system.

FIG. 1 shows a doubly fed wind turbine. Rotor 1 may capture wind energy that may be transmitted as torque to an induction generator 3. Embodiments of the invention may comprise a multiplication box 2 interposed to provide a rotation speed increase to a generator axle and reduce the torque. A converter 4 may be connected to the generator 3 rotor. Furthermore, the generator 3 stator may be directly connected to a power grid.

Embodiments of the invention may have the converter 4 connected to the grid by a transformer 5. The generator 3 rotor may consume or generate active power based on its operating point. Total active power (Pout) may be the sum of the power generated by the generator 3 stator (Ps) and the power that flows out of the converter 4 (Pc). Similarly, total reactive power (Qout) may be the sum of the reactive power generated by the generator 3 stator (Qs) and that generated by the converter 4 (Qc).

Figure 2:
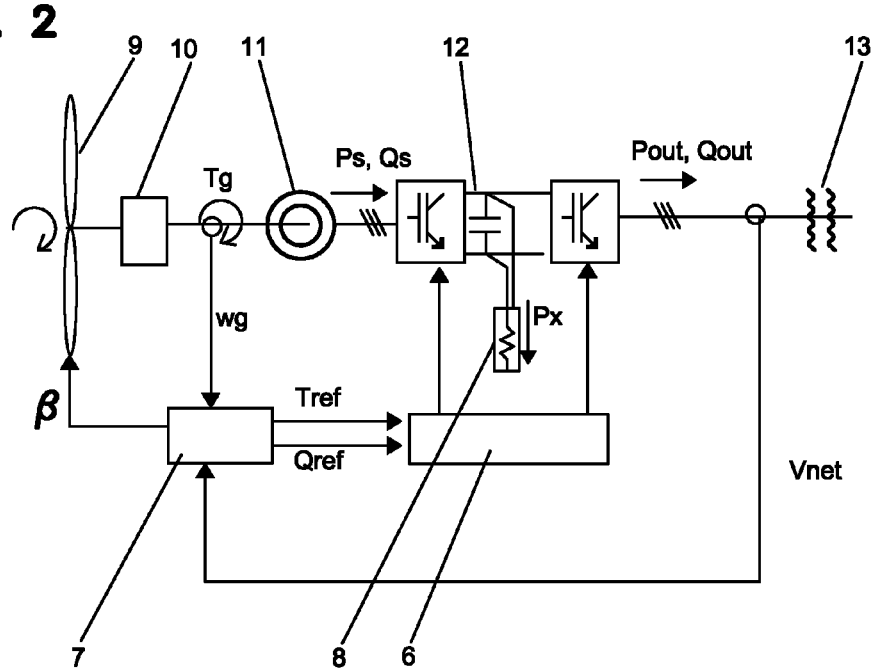
FIG. 2 is a view of a wind turbine with a total power converter.

FIG. 2 shows a rotor 9 that may transmit wind energy to a generator 11, which may be synchronous or asynchronous. For example, the generator may be permanent magnet synchronous or squirrel cage asynchronous. Embodiments of the invention may comprise a multiplication box 10 interposed to provide a rotation speed increase to a generator axle and reduce the torque. Other embodiments, however, may be built without a multiplier, dimensioning the generator 11 so as to generate electric power with a generator axle speed substantially equal to the rotation speed of the rotor 9.

Embodiments of the invention may comprise the converter 12 connected to the grid by a transformer 13. In this case, active (Pout) and reactive (Qout) power are those that flow out of the converter 12. Moreover, a converter 12 may be connected to the generator stator 11.

The coupling between rotor 1, 9 and generator 3, 11 may not be completely rigid, due to which the inertia of different transmission system components and torsional rigidity of the coupling between may give rise, at least, to a resonance frequency. A converter control unit 6 may, therefore, be employed to control the converter so as to achieve a torque instruction in the generator and a reactive power instruction.

In various embodiments, a control unit 7 of the wind turbine or aerogenerator may generate the generator torque and reactive power instructions. The control unit, based on the information relative to grid voltage and generator axle speed, may generate a torque instruction with a modulation of, for example, a frequency similar to the oscillations in the transmission system and a signal amplitude such as to dampen the oscillations. The control unit 7 may comprise a programmable device capable of dampening the oscillations in accordance with the various embodiments of this invention.

In the case of a doubly fed generator, it may be particularly advantageous to use stator power instructions, as stator power may be equal to the torque multiplied by a constant, the constant being grid frequency multiplied by (2*pi). Therefore, whenever torque instructions are hereinafter described, they may be equivalently substituted for power instructions.

Figure 3:
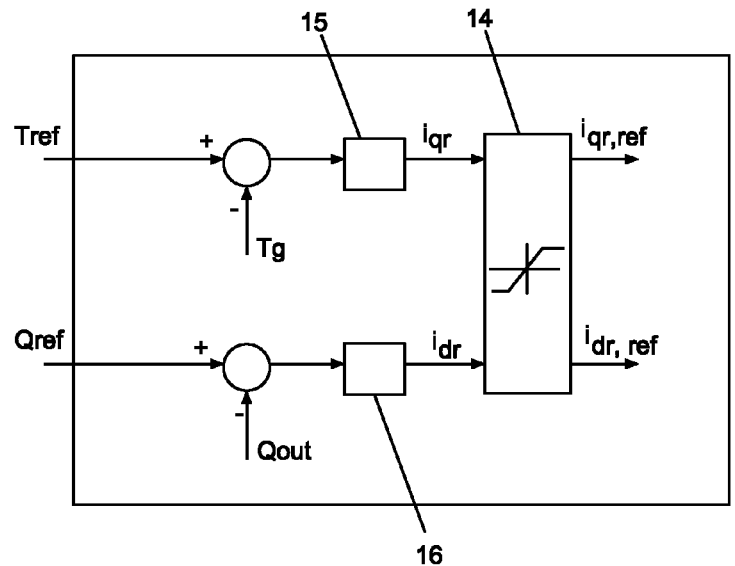
FIG. 3 is a schematic view of a control system.

FIG. 3 describes part of the converter control unit 6. For example, the torque and reactive power instructions may be transformed into current instructions. Embodiments of the present invention may employ a vector control technique, calculating instructions in axles (d) and (q), (iqr) and (idr), of modules 15 and 16. In various embodiments, modules 14 and 15 may be regulators that calculate the instructions (iqr) and (idr), respectively, based on the error between the torque and effective torque instruction in the generator, and the error between the reactive power and generated reactive power instruction. However, other types of regulators may be used. The instructions may be subsequently limited in module 14. For example, taking into account the lowest current limit of the generator and converter (Imax), in such a manner that the instructions do not imply a current that exceeds the limit values, we may fulfil the following equation:

$$\sqrt{I_{qr\_ref}^2 + I_{dr\_ref}^2} > I\max$$

Effective generator torque (Tg) may be similar to the torque instruction (Tref). However, during a voltage dip, the maximum evacuable power may decrease in parallel with voltage, as the maximum intensity may not be exceeded and the power may depend on the product of voltage and current. In turn, the active power generated may be the product of torque (Tg) and axle speed (wg), and without substantial changes in speed, the limitation in evacuable power may be equivalent to a limitation in generator torque (Tg).

In this situation as approached by the state of the art, the torque instruction (Tref) could not be achieved, the effective torque being substantially smaller than the reference and equal to that resulting from limiting the currents in module 14 to a maximum value. The final consequence may be that, even if the torque instruction (Tref) had the modulation resulting from applying the dampening term to the transmission system, the effective torque (Tg) would not have the modulation. Therefore, dampening in the state of the art disappeared during voltage dips or in another situation that limited the capacity to evacuate active power.

Figure 4:
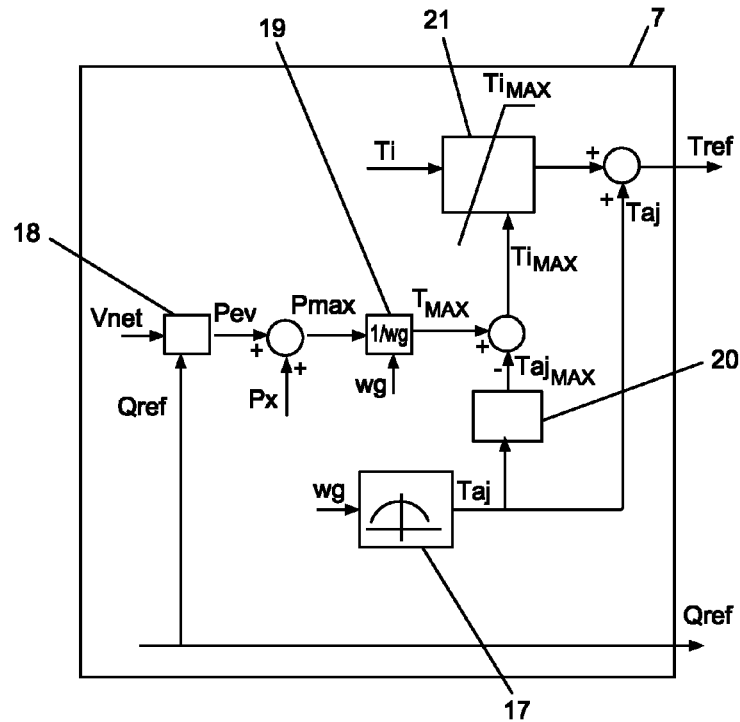
FIG. 4 is a schematic view of a control system of a converter.

FIG. 4 shows a detailed view of a wind turbine control unit according to embodiments of the invention. A module 17 may calculate a torque adjustment term (Taj) that may be applied to an initial torque instruction (Ti) in order to calculate the torque instruction (Tref). In various embodiments, the adjustment term may be calculated based on generator axle speed (wg). However, the adjustment term may also be calculated based on other indicative parameters of the oscillations in the generator transmission system.

Embodiments of the invention may apply the adjustment term (Taj) to the initial torque instruction (Ti) by addition. Other embodiments are also possible, wherein the adjustment term may be calculated with the opposite sign, being applied to the initial instruction by subtraction. Yet other embodiments are also possible, wherein the adjustment term (Taj) may be applied as a factor that is applied to the initial torque instruction (Ti) by multiplication, thereby achieving the adequate modulation to dampen the oscillations in the transmission system.

In various embodiments, the adjustment term calculation module 17 may be a band-pass filter wherein a main resonance frequency of the transmission system is within an active frequency range of the filter. The band-pass filter may also provide the frequency with the adequate amplitude and phase so that the resulting term (Taj), upon being applied to the initial instruction (Ti), dampens the oscillations of the transmission system.

Embodiments of the invention may calculate the maximum evacuable active power (Pev) to the grid based on grid voltage (Vnet) in a module 18. The reactive power reference (Qref) may also take into account to calculate the maximum evacuable power. The calculations may include the calculation of the reference reactive current (IR_ref) based on the active reference power associated to voltage controls and grid voltage. For example, the following equation may be used:

$$I_{R\_ref} = \frac{Q_{ref}}{\sqrt{3} \cdot V_{net}}$$

In embodiments wherein the generator is doubly fed, a nominal current (Inom) of the generator may be used as a current limit. In other embodiments wherein the generator may be a permanent magnet or squirrel cage generator and the converter may be a total power converter, the nominal current (Inom) of the converter may be used as a current limit.

The available active current margin (IA_disp) for torque generation may be calculated based on the reactive current (IR_ref) and the current limits of the most restrictive electric device, such as the generator or converter. For example, the following equation may be used:

$$I_{A\_disp} = \sqrt{I_{Nom}^2 - I_{R\_ref}^2}$$

In various embodiments, voltage controls may directly give the reference reactive current (IR_ref) as the reference, due to, for example, the evacuable power (Pev) calculation based on the grid voltage (Vnet) and the reactive current (IR_ref) in block 18. The evacuable power (Pev) may then be calculated based on the active current (IA_disp) and grid voltage (Vnet). For example, the following equation may be used:

$$P_{ev} = \sqrt{3} \cdot V_{net} \cdot I_{A\_disp}$$

Embodiments of the invention may comprise a turbine having a device 8 that may, at least in a transitory manner, consume electric power (Px). The electric power may be stored, for example, in batteries or consumed by dissipating it in a resistor or, for example, by generating hydrogen. The consumed power (Px) may then be added to the maximum evacuable power (Pev) to obtain the power (Pmax) based on which the maximum torque (Tmax) that can be obtained in the generator may be calculated in the module 19.

In various embodiments, the estimated maximum value (Tajmax) of the adjustment term (Taj) in the next cycles may be subtracted from the maximum torque (Tmax), obtaining the limitation value (Timax) of the initial torque instruction (Ti). The term (Tajmax) may be calculated in a module 20 as a peak value reached by (Taj) in previous calculation cycles, over a period of time of at least half the oscillation frequency period of the transmission system. Accordingly, the torque modulation amplitude required to dampen the vibrations may be estimated in this manner and, therefore, within the maximum available torque (Tmax), in what value the initial torque instruction (Ti) may be limited to reserve sufficient margin for effective dampening.

Embodiments of the invention may apply the calculated limit (Timax) to the initial torque instruction (Ti) in a module 21. Subsequently, the adjustment term (Taj) for transmission system dampening may be applied, finally resulting in the torque instruction (Tref).

In various embodiments of the invention, the adjustment term may be a term that is added to the initial instruction in order to calculate the final instruction. In turn, the limit value of the initial instruction may be calculated as the difference between the initial torque or power instruction at which active power substantially equal to the maximum evacuable active power would be generated, and the maximum value estimated for the adjustment term.

In this manner, the sum of the initial instruction, once limited, plus the adjustment term may give a final instruction that may not exceed that corresponding to the maximum evacuable power. Therefore, the final torque or power instruction may contain the modulation for dampening the transmission system, even in those situations where the evacuable power may be limited by the conditions of the power grid.

During a voltage dip the turbine may be normally requested to generate capacitive reactive power to collaborate in the re-establishment of the grid. In the case of a voltage surge outside of the grid limits, the situation is similar. It is normal to request the generation of adequate reactive power, in this case inductive, to collaborate in the re-establishment of the voltage.

As previously expounded, the maximum currents cannot be exceeded. Due to this, in embodiments of the invention, maximum evacuable active power may be calculated taking into account power grid voltage, in addition to the reactive power that must be evacuated to the power grid.

It is further possible to incorporate a wind turbine or aerogenerator devices that absorb electrical energy, either because they store it or because they consume it, normally in resistors. The distribution of energy to auxiliary devices disposed in the wind turbine to dissipate or store energy may also be taken into account to calculate the maximum evacuable active power. Maximum evacuable active power may be increased by the power that can be derived to the auxiliary devices.

In embodiments of the invention, the electric generator may be an induction generator, wherein the converter is connected to the rotor of the electric generator. In other embodiments of the invention, the electric generator may be permanent magnet synchronous or squirrel cage asynchronous, wherein the converter is connected to the generator stator. Furthermore, in various embodiments of the invention, a wind turbine control unit may configured to carry out the previously described control method. A wind turbine may comprise the control unit.

FIG. 5 shows a comparison of results with a system according to the state of the art (22 and 24) and with another according to embodiments of the invention (23 and 25). With a control system, according to the state of the art, in the event of voltage reduction the generator torque 22 may be limited to limiting the currents to the maximum, wherein they can circulate through the converter and the generator. Even if the torque instruction were to have a modulation component to dampen the transmission system, the modulation may not appear until voltage is re-established. Consequently, the oscillations induced in the transmission system, excited by the sudden torque drop, may be observed in generator speed 24. The oscillations may continue until re-establishment of the voltage allows, in the state of the art, initiation of torque 22 modulation to dampen the oscillations. The oscillations in the transmission system may produce component fatigue and higher peak speeds in generator speed.

In contrast to the foregoing, applying the control systems of various embodiments of the invention in the same situation, the torque 23 has the modulation required to dampen the transmission system, even when the torque is limited by a grid voltage reduction. As explained earlier, the initial torque is previously limited to the application of the dampening term in such a manner that the resulting torque may be less than the torque corresponding to the maximum currents (and which corresponds to the torque 22 of the state of the art). Consequently, in generator speed 25 an initial oscillation may be observed in the transmission system, resulting from the excitation of the vibration mode due to the sudden torque drop; however the oscillation is quickly dampened by the presence of the modulation in the torque 23. In this manner, component fatigue and the maximum generator speed peak may be reduced, reducing the risk of stopping due to overspeed.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for controlling a wind turbine of variable speed, the method comprising:
   calculating an initial instruction based on a turbine operating state, the initial instruction comprising one of: an initial torque instruction and initial power instruction;
   calculating an adjustment term associated with dampening vibration modes of a turbine transmission system, the adjustment term comprising one of: a torque adjustment term and a power adjustment term;
   estimating a maximum evacuable active power based at least in part on a voltage of a power grid and an active current limit of the wind turbine;
   applying a limit value to the initial instruction, the limit value being based at least in part on the maximum evacuable active power, wherein applying the limit value to the initial instruction further includes:
      estimating a maximum probable value for the adjustment term;
      calculating the limit value of the initial instruction based on the maximum evacuable active power and the maximum probable value for the adjustment term value; and
      applying said limit value to the initial instruction prior to applying the adjustment term for calculating the final instruction; and;
   calculating a final instruction, the final instruction comprising one of: a final torque instruction and a final power instruction, wherein calculating the final instruction comprises applying the adjustment term to the initial instruction; and
   employing the final instruction in controlling the wind turbine.

2. The method of claim 1, wherein estimating the maximum probable value for the adjustment term comprises estimating the maximum probable values for the adjustment term as a maximum adjustment value applied to previous calculation cycles.

3. The method of claim 1, wherein applying the adjustment term to the initial instruction comprises adding the adjustment term to the initial instruction to calculate the final instruction.

4. The method of claim 1, wherein calculating the limit value of the initial instruction based on the maximum evacuable active power and the maximum probable value for the adjustment term value comprises taking the difference between:
   the initial instruction at which active power substantially equal to the maximum evacuable active power would be generated, and
   the maximum probable value estimated for the adjustment term.

5. The method of claim 1, further comprising estimating the maximum evacuable active power based on a reactive power that must be evacuated to the power grid.

6. The method of claim 5, further comprising estimating the maximum evacuable active power based on a power distribution to auxiliary devices disposed in the wind turbine.

7. The method of claim 1, wherein employing the final instruction in controlling the wind turbine comprises transforming the final instruction into a current instruction for controlling the wind turbine.

8. A turbine having at least one component enabled to dampen vibrations associated with the turbine, the turbine comprising:
   a rotor;
   a power train coupled to the rotor that transmits mechanical power to an electric generator;
   a converter connected to the generator, the converter being employed to control one of: generator torque and generator power; and
   a control unit that calculates one of: torque instructions and power instructions, the control unit being operative to:
      calculate an initial instruction based on a turbine operating state,
      calculate an adjustment term to dampen the vibrations, the adjustment term comprising one of: a torque adjustment term and power adjustment term,
      estimate a maximum evacuable active power based at least in part on a voltage of a power grid and an active current limit of the turbine;
      apply a limit value to the initial instruction, the limit value being based at least in part on the maximum evacuable active power, wherein the control unit is further operative to:
         estimate a maximum probable value for the adjustment term;

calculate the limit value of the initial instruction based on the maximum evacuable active power and the maximum probable value for the adjustment term value; and apply said limit value to the initial instruction prior to applying the adjustment term for calculating the final instruction, and calculate a final instruction with an application of the adjustment term to the initial instruction, the final instruction comprising one of: a final torque instruction and a final power instruction.

9. The turbine of claim 8, wherein the electric generator is an induction generator, and wherein the converter is connected to a rotor of the electric generator.

10. The turbine of claim 8, wherein the electric generator is one of: permanent magnet synchronous and squirrel cage asynchronous, and wherein the converter is connected to a stator of the electric generator.

11. The turbine of claim 8, wherein the control unit being operative to estimate the maximum evacuable active power further comprises the control unit being operative to estimate the maximum evacuable active power based on a reactive power that must be evacuated to the power grid.

12. The turbine of claim 11, wherein the control unit being operative to estimate the maximum evacuable active power further comprises the control unit being operative to estimate the maximum evacuable active power based on a power distribution to auxiliary devices disposed in the turbine.

13. The turbine of claim 8, wherein the control unit is further operative to provide the final instruction for transformation into a current instruction for controlling the wind turbine.

14. A system having at least one component enabled to dampen vibrations of the system, the system comprising:
a rotor;
a power train coupled to the rotor that transmits mechanical power to an electric generator; and
a converter connected to the generator, the converter being employed to control one of: generator torque and generator power, the control of the one of: the generator torque and the generator power being based at least in part on:
a calculation of an initial instruction based on a system operating state,
a calculation of an adjustment term to dampen the vibrations, the adjustment term comprising one of: a torque adjustment term and power adjustment term,
an estimation of a maximum evacuable active power based at least in part on a voltage of a power grid and an active current limit for the system;
an application of a limit value to the initial instruction, the limit value being based at least in part on the maximum evacuable active power, wherein the application of the limit value includes:
an estimation of a maximum probable value for the adjustment term;
a calculation of the limit value of the initial instruction based on the maximum evacuable active power and the maximum probable value for the adjustment term value; and
an application of said limit value to the initial instruction prior to applying the adjustment term for calculating the final instruction, and
a calculation of a final instruction with an application of the adjustment term to the initial instruction, the final instruction comprising one of: a final torque instruction and a final power instruction.

15. The system of claim 14, wherein the electric generator is an induction generator, and wherein the converter is connected to a rotor of the electric generator.

16. The system of claim 14, wherein the electric generator is one of: permanent magnet synchronous and squirrel cage asynchronous, and wherein the converter is connected to a stator of the electric generator.

17. The system of claim 14, wherein the estimation of the maximum evacuable active power is further based on a reactive power that must be evacuated to the power grid.

18. The system of claim 17, wherein the estimation of the maximum evacuable active power is further based on a power distribution to auxiliary devices disposed in the system.

19. The system of claim 14, wherein the estimation of the maximum probable value for the adjustment term comprises an estimation of the maximum probable values for the adjustment term based on a maximum adjustment value applied to previous calculation cycles.

\* \* \* \* \*